United States Patent Office 3,051,578
Patented Aug. 28, 1962

3,051,578
COMPOSITION AND PROCESS FOR TREATING POTATOES
Eugene D. Kitzke, South Milwaukee, Wis., assignor to S. C. Johnson & Son, Inc., Racine, Wis.
No Drawing. Filed Mar. 31, 1960, Ser. No. 18,824
7 Claims. (Cl. 99—154)

This invention relates to a method and composition for inhibiting greening of potatoes and to potatoes which have been treated in accordance with the present method.

Most potatoes, and particularly the light skinned variety which includes the California Long White, White Sebago and the Katahdin are particularly vulnerable to greening when displayed in retail markets. It is believed that greening is caused by the production of chlorophyll and that the chlorophyll production is directly related to the intensity and duration of light to which the potato is subjected. In the white skinned varieties of potatoes, greening is usually detectable very early. Although it is not as readily detected in either the red skinned or the russet skinned potatoes such as the Red Potomacs and Russet Burbanks, it nevertheless exists and is objectionable. Chlorophyll is the common pigment found in green plants, and the yellowish to greenish coloring which develops as a result of its formation in the potato skin is harmless. Nonetheless, it is objectionable to the consumer since it is an appearance defect. Even slight coloring will cause potatoes to be down-graded in the market place. Greening in potatoes is undesirable for an additional reason, i.e., generally, where it occurs, solanine is likely to be present. Solanine, a toxic material, is usually formed along with chlorophyll, imparting a bitter or undesirable flavor.

Greening of potatoes has become a serious problem only in recent years with the advent of very high illumination in stores. Potatoes often were not washed, and as a result, were protected from light rays by the dirt remaining on them after packing. Modern super-markets have a large number of fluorescent lights and frequently the walls are painted in light colors so that there are many reflective surfaces, increasing the intensity of the light. The light incidence under which potatoes have been displayed in super-markets have been found to reach as high as 375 foot-candles. In light intensities far less than this, potato tubers are quickly light burned and become green in appearance. Another factor which has intensified the problem of potato greening is the advent of the transparent plastic bag and the customer's acceptance of products packaged in these bags. The consumer is no longer satisfied with the older kraft paper and burlap bags which protected the potatoes from lights, but also restricted the customer's view of his purchase.

As late as this year, publications have been issued by well-known olericulturists advising that the best known way of protecting potatoes from greening is to display them in burlap or kraft paper bags. It is advised that potatoes should be kept in dark storage rooms or containers until immediately before display and never located on side walls or in front of stores, especially if potatoes are packaged in polyethylene or window bags. It is said that displays should be covered with canopies to prevent excess light from reaching potatoes, and that suppliers should be encouraged to protect potatoes from light as much as possible during packing and shipment.

An object of the present invention is a more desirable method of treating potatoes to inhibit greening.

Another object of the invention is a potato which will remain blanched in appearance during the normal period of light exposure to which the potato is subjected in the super-market prior to purchase.

A further object of the invention is a composition which will inhibit the formation of chlorophyll in potatoes.

These objects and others which will become apparent are accomplished by the present invention which comprises treating potatoes with a diluent containing ethylene diamine tetra-acetic acid, its soduim, potassium and calcium salts. These salts include mono, di, tri and tetra sodium salts of ethylene diamine tetra-acetic acid, the mono and di calcium salts of ethylene diamine tetra-acetic acid, disodium calcium salts of ethylene diamine tetra-acetic acid, dipotassium calcium salts of ethylene diamine tetra-acetic acid and the mono, di, tri and tetra potassium salts of ethylene diamine tetra-acetic acid. The acid and its salts may be used alone or as mixtures. Ethylene diamine tetra-acetic acid and the above salts or mixtures thereof may be represented by the formula

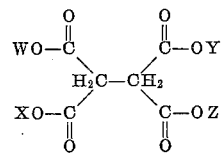

W, X, Y and Z being ½ Ca, H, Na or K. The salts may be used in either their hydrated or nonhydrated forms. Ethylene diamine tetra-acetic acid and its salts may be incorporated into a wide number of diluents in the present invention. The diluent containing the active ingredient will consist of solutions, emulsions or solids. These may be applied to the potatoes in a variety of ways such as by spraying, dipping, foaming, dusting, etc.

The diluent for the active agent serves to dilute the agent so that a given amount can be spread more efficiently over the surfaces of the potatoes. It also makes it possible to bring the active agent into more intimate contact with the potato surfaces. These results are achieved most readily by the use of a diluent such as water in which the active ingredients are soluble. However, any liquid carrier in which the active agent is soluble may be used. Since most potatoes are consumed as food, the carrier should not leave a toxic residue on the potatoes. Liquid diluents include both hydrocarbon and oxygen containing liquids. Suitable hydrocarbon liquids include the cyclic and acyclic hydrocarbons having 5 or more carbon atoms such as pentane, hexane, heptane, octane, nonane, decane, cyclopentane, cyclohexane, cycloheptane, cyclooctane, etc.; aromatic hydrocarbons such as xylene, toluene, or other alkyl benzenes, alkyl naphthalenes, e.g., methyl naphthalene, dimethyl naphthalene, trimethyl naphthalene, ethyl naphthalene, etc. The oxygen containing liquids include water which is the preferred diluent, alcohols, ethers, esters, and ketones. Aliphatic monohydric alcohols, preferably those containing from 1–5 carbon atoms are operable. Other oxygen containing compounds include methanol, ethanol, the butyl alcohols, allyl alcohols, ethylene glycol, propylene glycol, ethyl ether, Cellosolve, methyl acetate, ethyl acetate, acetone, methyl ethyl ketone, methyl ethyl ether, and other low boiling compounds usually containing up to 10 carbon atoms, but preferably not more than about 5 carbon atoms.

It is frequently desirable to add a wetting or emulsifying agent to the formulation. An emulsifying agent satisfactorily disperses the active ingredient with the liquid carrier where the mutual solubilities of the carrier and the active ingredient is such that complete solubility is not achieved. It is believed that the addition of a wetting agent enhances the active ingredient's adhesion to the skin of the potato so as to produce a more effective inhibition of chlorophyll formation. It will be recognized that wetting and emulsifying agents are similar compositions, a single compound frequently serving both purposes. Both anionic and cationic wetting agents and emulsifiers are acceptable. These include sodium alkyl aryl sulfonates, sulfonated dicarboxylic acid esters such as dioctyl sodium sulfosuccinate, alkyl naphthalenes, alkyl aryl polyether alcohols, ethylene oxide condensates, sulfonated fatty acid esters, and fatty acid amine condensates. The amount of emulsifier or wetting agent used will depend upon the specific diluent, active ingredient and emulsifying or wetting agent used. Usually, the amount will vary between 0.1% and 5.0% by weight of the total composition.

It has also been found highly desirable for the liquid diluent to contain a wax, resin, or resin-wax blend. Preferably, the wax will be a vegetable ester wax such as carnauba, candelilla, sugar cane and the like, alone or blended with the hydrocarbon and mineral waxes such as paraffin, ozokerite, etc. Synthetic waxes may also be used. Useful resins include polyvinyl acetate, coumarone indene resins and the rosin esters such as the diethylene glycol rosin ester. The waxes and resins have the ability to lay down a semi-permanent to permanent film on the potato holding the active ingredient in intimate contact with its surface. Better utilization of the active ingredient and a prolonged anti-greening effect are achieved in this manner.

The amount of active ingredient which will be required to inhibit greening will vary, depending upon the type of potatoes treated, the potato's agent, the intensity of light to which it is exposed, and the duration of the exposure. In general, however, at least about 0.1% of the active ingredient is required, based on the weight of the liquid or emulsion with which it is applied. There is no known upper limit of the amount of active ingredient which could be used. This will obviously depend upon the solubility of the active ingredient in the carrier liquid or the amount which can be satisfactorily emulsified in the liquid diluent. In general, this will not exceed approximately 5% by weight of the liquid diluent.

As mentioned earlier, the active ingredients may be prepared for use in the present invention with a solid diluent. Such formulations may be prepared by spraying a solution of the active ingredient into a highly absorptive solid diluent such as an absorptive silica. The coated diluent may be applied as is, or it may then be further diluted by blending with another solid diluent such as clay, talc, silica, bentonite, diatomaceous earth, chalk, wood flour and the like to produce a finished dust containing from about 1 to about 30% by weight of the active ingredient. These solid formulations may be made wettable so as to enhance their adhesive ability. For this, use may be made of any of the liquids discussed earlier. The solid formulations may also be prepared by grinding the active ingredient together with a solid diluent in any suitable grinding machine such as a hammer mill.

Several specific examples will be presented in the following table.

WHITE SEBAGO

| Ex. No. | | Light exposure | | |
|---|---|---|---|---|
| | | Before | 48 hrs. | 7 days |
| 1 | 0.5% terta sodium EDTA water solution plus wetting agent | Blanched | Blanched | Blanched. |
| 2 | 0.5% tetra potassium EDTA water solution plus wetting agent | do | do | Do. |
| 3 | 0.5% Disodium calcium EDTA water solution plus wetting agent | do | do | Do. |
| 4 | Control, water | do | Green | Green. |

CALIFORNIA LONG WHITE

| | | | | |
|---|---|---|---|---|
| 5 | 0.5% tetra sodium EDTA water solution plus wetting agent | Blanched | Blanched | Blanched. |
| 6 | 0.5% tetra potassium EDTA water solution plus wetting agent | do | do | Do. |
| 7 | 0.5% disodium calcium EDTA water solution plus wetting agent | do | do | Do. |
| 8 | Control, water | do | Green | Green. |

IDAHO RUSSETS

| | | | | |
|---|---|---|---|---|
| 9 | 0.5% tetra sodium EDTA water solution plus wetting agent | Blanched | Blanched | Blanched. |
| 10 | 0.5% tetra potassium EDTA water solution plus wetting agent | do | do | Do. |
| 11 | 0.5% disodium clacium EDTA water solution plus wetting agent | do | do | Do. |
| 12 | Control, water | do | Green | Green. |

WHITE SEBAGO

| | | | | |
|---|---|---|---|---|
| 13 | 0.5% tetra sodium EDTA wax emulsion | Blanched | Blanched | Blanched. |
| 14 | 0.5% tetra potassium EDTA wax emulsion | do | do | Do. |
| 15 | 0.5% disodium calcium EDTA wax emulsion | do | do | Do. |
| 16 | Control, water | do | Green | Green. |

CALIFORNIA LONG WHITE

| | | | | |
|---|---|---|---|---|
| 17 | 0.5% tetra sodium EDTA wax emulsion | Blanched | Blanched | Blanched. |
| 18 | 0.5% tetra potassium EDTA solution plus wetting agent | do | do | Do. |
| 19 | 0.5% disodium calcium EDTA wax emulsion | do | do | Do. |
| 20 | Control, water | do | Green | Green. |

IDAHO RUSSETS

| | | | | |
|---|---|---|---|---|
| 21 | 0.5% tetra sodium EDTA wax emulsion | Blanched | Blanched | Blanched. |
| 22 | 0.5% tetra potassium EDTA wax emulsion | do | do | Do. |
| 23 | 0.5% disodium calcium EDTA wax emulsion | do | do | Do. |
| 24 | Control, water | do | Green | Green. |

CALIFORNIA LONG WHITE

| Ex. No. | | Light exposure | | | |
|---|---|---|---|---|---|
| | | Before | 24 Hrs. | 48 Hrs. | 72 Hrs. |
| 25 | 0.1% tetra sodium EDTA water solution plus wetting agent | Blanched | Blanched | Green | Green. |
| 26 | 0.2% tetra sodium EDTA water solution plus wetting agent | do | do | do | Do. |
| 27 | 0.3% tetra sodium EDTA water solution plus wetting agent | do | do | Blanched | Do. |
| 28 | 0.4% tetra sodium EDTA water solution plus wetting agent | do | do | do | Do. |
| 29 | 0.5% tetra sodium EDTA water solution plus wetting agent | do | do | do | Blanched. |
| 30 | 1.0% tetra sodium EDTA water solution plus wetting agent | do | do | do | Do. |
| 31 | 5.0% tetra sodium EDTA water solution plus wetting agent | do | do | do | Do. |
| 32 | Control, water | do | Green | Green | Green. |
| 33 | 0.25% tetra sodium EDTA wax emulsion | do | Blanched | Blanched | Do. |
| 34 | 0.50% tetra sodium EDTA wax emulsion | do | do | do | Blanched. |
| 35 | 1.00% tetra sodium EDTA wax emulsion | do | do | do | Do. |
| 36 | 5.00% tetra sodium EDTA wax emulsion | do | do | do | Do. |
| 37 | Control, water | do | Green | Green | Green. |

CALIFORNIA LONG WHITE

| Ex. No. | | Light exposure | | |
|---|---|---|---|---|
| | | Before | 48 hrs. | 72 Hrs. |
| 38 | 0.5% tetra sodium EDTA solution plus wetting agent | Blanched | Blanched | Blanched. |
| 39 | 0.5% tetra sodium EDTA solution minus etting agent | do | do | Green. |
| 40 | 0.5% disodium calcium EDTA solution plus wetting agent | do | do | Blanched. |
| 41 | 0.5% disodium calcium EDTA solution minus wetting agent | do | do | Green. |
| 42 | Control, water | do | Green | Do. |

In each of the examples where the use of a wetting agent is indicated, that agent consisted of polyethylene glycol monooleate. The wax emulsion was a standard prototype consisting of 9.4% blended ester waxes, 1.0% oleic acid, 0.4% triethanol amine, 0.5% morpholine, and 88.7% water. Throughout the specification percent (%) means percent by weight.

Now having described the invention and presented a number of specific examples, what is claimed is:

1. A method of inhibiting greening of unpeeled potatoes which comprises treating said unpeeled potatoes with an anti-greening composition containing an anti-greening agent selected from the group consisting of ethylene diamine tetraacetic acid, its sodium, potassium and calcium salts and mixtures thereof in an amount ranging from about 0.1 to about 5% by weight of the anti-greening composition, and a liquid diluent for said agent.

2. A method of inhibiting greening of unpeeled potatoes which comprises treating said unpeeled potatoes with an anti-greening composition containing an anti-greening agent selected from the group consisting of ethylene diamine tetraacetic acid, its sodium, potassium and calcium salts and mixtures thereof in an amount ranging from about 0.1 to about 5% by weight of the anti-greening agent, an emulsifying agent in an amount ranging from about 0.1 to about 5% by weight of the anti-greening composition, and a liquid diluent for said anti-greening agent.

3. A method of inhibiting greening of unpeeled potatoes which comprises treating said unpeeled potatoes with an aqueous solution of an anti-greening agent selected from the group consisting of ethylene diamine tetraacetic acid, its sodium, potassium and calcium salts and mixtures thereof in an amount ranging from about 0.1 to about 5% by weight of the aqueous solution.

4. A method of inhibiting greening of unpeeled potatoes which comprises treating said unpeeled potatoes with an aqueous wax emulsion of an anti-greening agent selected from the group consisting of ethylene diamine tetraacetic acid, its sodium, potassium and calcium salts and mixture thereof, in an amount ranging from about 0.1 to about 5% by weight of the aqueous wax emulsion.

5. A method of inhibiting greening of unpeeled potatoes which comprises treating said unpeeled potatoes with an anti-greening composition containing an anti-greening agent selected from the group consisting of ethylene diamine tetraacetic acid, its sodium, potassium and calcium salts and mixtures thereof in an amount ranging from about 0.1 to about 5% by weight of the anti-greening composition, and a liquid hydrocarbon diluent for said agent.

6. A method of inhibiting greening of unpeeled potatoes which comprises treating said unpeeled potatoes with an anti-greening composition containing an anti-greening agent selected from the group consisting of ethylene diamine tetraacetic acid, its sodium, potassium and calcium salts and mixtures thereof in an amount ranging from about 0.1 to about 5% by weight of the anti-greening composition, and an organic oxygen containing diluent for said agent.

7. A method of inhibiting greening of unpeeled potatoes which comprises treating said unpeeled potatoes with an anti-greening composition containing an anti-greening agent selected from the group consisting of ethylene diamine tetraacetic acid, its sodium, potassium and calcium salts and mixtures thereof in an amount ranging from about 1% to about 30% by weight of the anti-greening composition, and a solid pulverulent diluent for said agent.

References Cited in the file of this patent

UNITED STATES PATENTS

| 2,506,793 | Kalmar | May 9, 1950 |
| 2,569,075 | Schade | Sept. 25, 1951 |
| 2,846,317 | Bersworth et al. | Aug. 5, 1958 |
| 2,910,367 | Melnick et al. | Oct. 27, 1959 |